(12) United States Patent
Wang et al.

(10) Patent No.: US 10,762,382 B2
(45) Date of Patent: Sep. 1, 2020

(54) IMAGE RECOGNITION BASED ON AUGMENTED REALITY

(71) Applicant: Alibaba Group Holding Limited, George Town (KY)

(72) Inventors: Linqing Wang, Hangzhou (CN); Xiaodong Zeng, Hangzhou (CN); Hong Zhang, Hangzhou (CN); Feng Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/841,467

(22) Filed: Apr. 6, 2020

(65) Prior Publication Data
US 2020/0234077 A1 Jul. 23, 2020

Related U.S. Application Data

(63) Continuation of application No. 15/864,572, filed on Jan. 8, 2018, now Pat. No. 10,614,341.

(30) Foreign Application Priority Data

Jan. 11, 2017 (CN) .......................... 2017 1 0018395

(51) Int. Cl.
*G06K 9/62* (2006.01)
*H04L 29/08* (2006.01)
(Continued)

(52) U.S. Cl.
CPC ....... *G06K 9/6202* (2013.01); *G06F 16/5838* (2019.01); *G06K 9/00671* (2013.01);
(Continued)

(58) Field of Classification Search
CPC ............ G06K 9/6202; G06K 9/00671; G06K 9/4604; G06T 11/60; H04L 67/22;
(Continued)

(56) References Cited

U.S. PATENT DOCUMENTS 7,522,163 B2 4/2009 Holmes
7,945,099 B2 * 5/2011 Gokturk ............. G06K 9/00664
382/209

(Continued)

FOREIGN PATENT DOCUMENTS

CN 103119544 5/2013
CN 104834375 8/2015
(Continued)

OTHER PUBLICATIONS

Abe et al., "Robust Image-identification Methods for Camera-equipped Mobile Devices," Transactions of Information Processing Society of Japan, Mar. 2009, 2(1):10-21 (with English abstract).

(Continued)

*Primary Examiner* — Wesley J Tucker
(74) *Attorney, Agent, or Firm* — Fish & Richardson P.C.

(57) ABSTRACT

A method includes: receiving, at a server and from an augmented reality device, user information of a user using the augmented reality device; generating, by the server, a picture feature sample sub-library corresponding to the user information, including screening out, from a preset picture feature sample library, picture feature samples associated with the user information; and providing, to the augmented reality device, the picture feature sample sub-library, wherein the picture feature sample sub-library can be configured to be used by the augmented reality device to perform, during image scanning of an offline environment of the user, image recognition of images scanned from the offline environment by comparing the scanned images to picture features in the picture feature sample sub-library.

20 Claims, 4 Drawing Sheets

(51) Int. Cl.
*H04L 29/06* (2006.01)
*G06K 9/00* (2006.01)
*G06F 16/583* (2019.01)
*G06T 11/60* (2006.01)
*G06K 9/46* (2006.01)

(52) U.S. Cl.
CPC ............ *G06K 9/4604* (2013.01); *G06T 11/60* (2013.01); *H04L 67/22* (2013.01); *H04L 67/26* (2013.01); *H04L 67/38* (2013.01); *H04L 67/20* (2013.01)

(58) Field of Classification Search
CPC ......... H04L 67/38; H04L 67/26; H04L 67/20; G06F 16/5838
See application file for complete search history.

(56) References Cited

U.S. PATENT DOCUMENTS

| | | | |
|---|---|---|---|
| 8,620,772 | B2 | 12/2013 | Owen |
| 8,654,149 | B2 | 2/2014 | He |
| 9,202,254 | B2 | 12/2015 | Rodriguez et al. |
| 9,678,617 | B2 | 6/2017 | Soon-shiong |
| 9,857,964 | B2 | 1/2018 | Soon-shiong |
| 10,614,341 | B2 | 4/2020 | Wang et al. |
| 2006/0056732 | A1 | 3/2006 | Holmes |
| 2009/0237546 | A1* | 9/2009 | Bloebaum .......... H04N 1/00323 348/333.01 |
| 2009/0254539 | A1* | 10/2009 | Wen ...................... G06F 16/583 |
| 2011/0279445 | A1 | 11/2011 | Murphy et al. |
| 2014/0201264 | A1 | 7/2014 | Soon-shiong |
| 2015/0010237 | A1 | 1/2015 | Nomura et al. |
| 2015/0092061 | A1 | 4/2015 | Chao et al. |
| 2015/0124106 | A1 | 5/2015 | Tomita |
| 2017/0004382 | A1 | 1/2017 | Inoue et al. |
| 2017/0103440 | A1* | 4/2017 | Xing .................. G06Q 30/0625 |
| 2017/0172696 | A1 | 6/2017 | Saget et al. |
| 2017/0242576 | A1 | 8/2017 | Soon-shiong |
| 2017/0352282 | A1 | 12/2017 | Anderson et al. |
| 2018/0197043 | A1 | 7/2018 | Wang et al. |
| 2018/0350144 | A1* | 12/2018 | Rathod ............. G06Q 20/3276 |
| 2019/0005724 | A1* | 1/2019 | Pahud ....................... G06T 7/70 |
| 2019/0311513 | A1 | 10/2019 | Han |

FOREIGN PATENT DOCUMENTS

| | | |
|---|---|---|
| CN | 105227448 | 1/2016 |
| CN | 105243142 | 1/2016 |
| JP | 2015062090 | 4/2015 |
| JP | 2015090553 | 5/2015 |
| JP | 2016091079 | 5/2016 |
| WO | WO 2013115202 | 8/2013 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Extended European Search Report in European Application No. 18739418.4, dated Dec. 13, 2019, 8 pages.
International Search Report and Written Opinion in International Application No. PCT/US2018/013344, dated Mar. 23, 2018, 6 pages.
Nakamoto, "Bitcoin: A Peer-to-Peer Electronic Cash System," www.bitcoin.org, 2005, 9 pages.
PCT International Preliminary Report on Patentability in International Application No. PCT/US2018/013344, dated Jul. 16, 2019, 6 pages.

* cited by examiner

IMAGE RECOGNITION BASED ON AUGMENTED REALITY

This application is a continuation of and claims the benefit of priority to U.S. patent application Ser. No. 15/864,572, filed on Jan. 8, 2018, which claims priority to Chinese Patent Application No. 201710018395.1, filed on Jan. 11, 2017, which are incorporated by reference in their entirety.

BACKGROUND

The present disclosure relates to the field of augmented reality, and in particular, to image recognition based on augmented reality. Augmented Reality (AR) technology is a technology that superposes a corresponding picture, video, and 3D model on an image by calculating a location and an angle of the image in real time, to fuse a virtual world with a real world. An AR device can recognize images in an offline environment of a user in real time by using picture recognition materials locally stored in the AR device. The AR device can display, according to a pre-configured presentation effect, corresponding presentation data in an augmented manner on a location of a recognized specific offline target. However, as the AR technology evolves and AR scenes become increasingly abundant, a computation amount of an AR device can also increases day by day. Performing large amounts of computation can cause the AR device to consume more power, which can cause the AR device to heat up.

SUMMARY

The present disclosure describes techniques for image recognition based on augmented reality.

In an implementation, a method includes: receiving, at a server and from an augmented reality device, user information of a user using the augmented reality device; generating, by the server, a picture feature sample sub-library corresponding to the user information, including screening out, from a preset picture feature sample library, picture feature samples associated with the user information; and providing, to the augmented reality device, the picture feature sample sub-library, wherein the picture feature sample sub-library can be configured to be used by the augmented reality device to perform, during image scanning of an offline environment of the user, image recognition of images scanned from the offline environment by comparing the scanned images to picture features in the picture feature sample sub-library.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the amount of image information pushed by a server to a client can be reduced. Second, computations performed by a client can be reduced.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
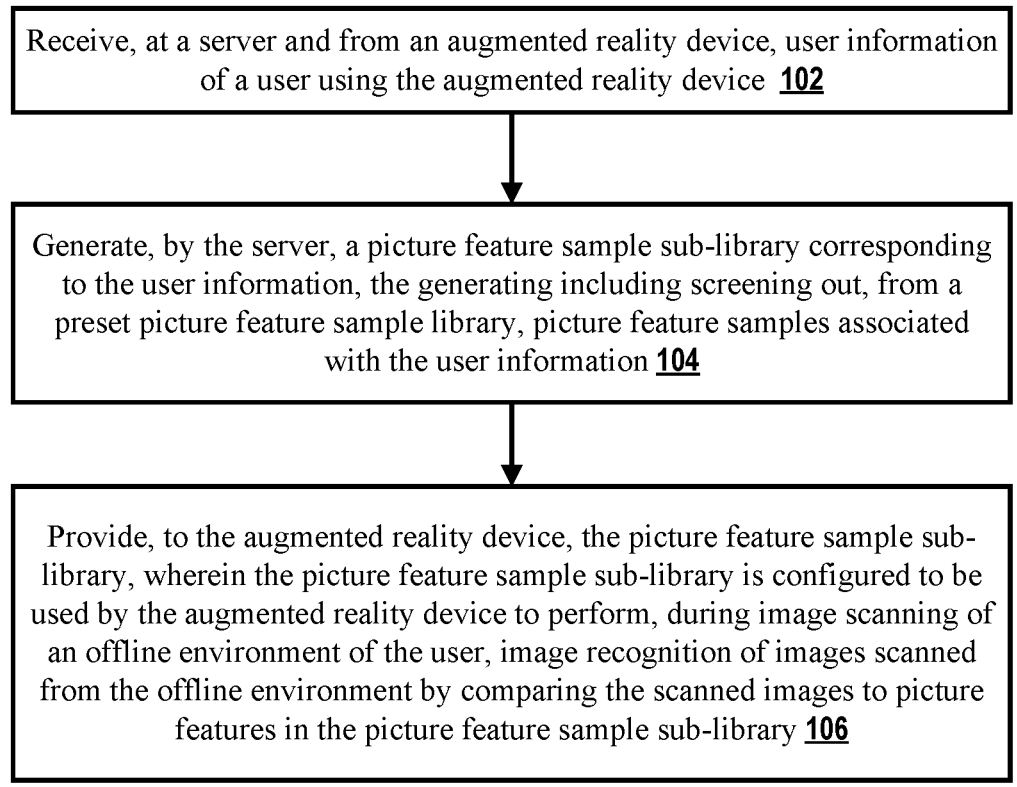
FIG. 1 is a flow chart illustrating an example of a method for performing image recognition method based on augmented reality, according to an implementation of the present disclosure.
Figure 1:

The following detailed description describes image recognition techniques used in augmented reality (AR) systems, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

During a process of scanning images in an offline environment of a user, such as is done in conventional systems, an AR device can perform local image recognition on the scanned image information in real time by using a pre-configured picture recognition material library. The AR device can be a device on which AR software is installed or that is integrated with an AR function. For example, the AR device can be a third-party payment application that is integrated with an AR service function. The picture recognition material library can include picture feature samples extracted from a large number of picture samples of offline targets. After the image information is scanned from the offline environment of the user, the AR device can extract a picture feature from the image information by using an image recognition algorithm included in an AR engine. The AR device can then calculate degrees of similarity between the extracted picture feature and the picture feature samples in the picture recognition material library one-by-one so as to recognize an offline target in the scanned image information. After image recognition is completed, the AR device can further calculate a location of the recognized offline target in a real scenario and then display corresponding presentation data in an augmented manner according to a pre-configured presentation effect. However, performing image comparisons on the AR device can use significant resources of the AR device.

In the present disclosure, an augmented reality server can gather user information uploaded by an augmented reality (AR) device and screen out picture feature samples associated with the user information from a preset picture feature sample library. An AR server, such as an AR service platform, can generate a picture feature sample sub-library corresponding to the user information on the basis of the screened-out picture feature samples. The AR server can then push the picture feature sample sub-library to the AR device. In this way, during image scanning in an offline environment of a user, the AR device can perform image recognition on the scanned image information on the basis of the picture feature sample sub-library. Because the augmented reality server screens the picture feature sample library on the basis of the user information, the number of picture recognition materials pushed by the augmented reality server to the AR device and the number of picture recognition materials used by the AR device to perform image recognition can be significantly reduced. The reduction in pushed information can further reduce the computation amount of the AR device and improve the image recognition efficiency of the AR device.

During execution of image recognition, the picture recognition material library, presentation data, and a corresponding presentation effect (for example, using an animation effect) to be used by the AR device can be pre-configured on an AR server. The presentation data can be pre-configured for each offline target in the picture recognition material library so that the information can be presented as needed. Before starting the image scanning, the AR device can download and locally store the pre-configured picture recognition material library as well as the corresponding presentation data and presentation effects from the AR server.

If there are too many materials in the picture recognition material library, a data storage pressure of the AR device can increase. In some implementations, the computation amount of the AR device can be rather large during image recognition, which can cause problems related to power consumption, abnormal heating, and low image recognition efficiency. To avoid these issues, the present disclosure includes techniques for an AR server that can flexibly screen out picture recognition materials on the basis of user information uploaded by the AR device and push the screened-out materials to the AR device.

By gathering user information uploaded by the AR device, the AR server can screen out picture feature samples associated with the user information from a preset picture feature sample library. The AR server can then generate a picture feature sample sub-library corresponding to the user information on the basis of the screened-out picture feature samples. The AR server can then push the picture feature sample sub-library to the AR device, so that during image scanning in an offline environment of a user, the AR device can perform image recognition on the scanned image information on the basis of the picture feature sample sub-library.

FIG. 1 is a flow chart illustrating an example of a method 100 for performing image recognition method based on augmented reality, according to an implementation of the present disclosure. Method 100 can be applied to an AR server, for example. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, user information of a user using an augmented reality device is received at a server and from the augmented reality device. For example, user information uploaded by an AR device can be gathered. The user information can include, for example, a location of the user. In some implementations, the location can be determined using global positioning system (GPS) capabilities of the AR device. In some implementations, the location can be input or identified by the user using a user interface on the AR device. From 102, method 100 proceeds to 104.

At 104, a picture feature sample sub-library corresponding to the user information is generated by the server. Generating the picture feature sample sub-library includes screening out, from a preset picture feature sample library, picture feature samples associated with the user information. For example, picture feature samples associated with the user information can be screened out from a preset picture feature sample library. The picture feature sample sub-library refers to a picture feature sample library created by the AR server by using some picture feature samples that are screened out from the picture feature sample library on the basis of the user information. The picture feature sample sub-library can correspond to the user information, and is a subset of the picture feature sample library. From 104, method 100 proceeds to 106.

At 106, the picture feature sample sub-library is provided to the augmented reality device. The picture feature sample sub-library can be configured to be used by the augmented reality device to perform, during image scanning of an offline environment of the user, image recognition of images scanned from the offline environment by comparing the scanned images to picture features in the picture feature sample sub-library. For example, a picture feature sample sub-library corresponding to the user information can be generated on the basis of the screened-out picture feature samples. The server can push the picture feature sample sub-library to the AR device so that the AR device, during image scanning in an offline environment of the user, can perform image recognition on the scanned image information on the basis of the picture feature sample sub-library. After 106, method 100 stops.

The AR device can perform image scanning on a reality scene in an offline environment of a user by using a portable image scanning tool, and the AR device can initiate image recognition for a scanned offline target. Further, the AR device can perform, by using a front-end AR engine of the AR device, visualization rendering on presentation data which corresponds to a recognized offline target and pushed to the AR device by a back-end AR server. The AR device can overlay and fuse the rendered presentation data with the reality scene (for example, a reality scene image). The AR device can then display, according to a pre-configured presentation effect, the presentation data in an augmented manner on a location corresponding to the recognized offline target in the reality scene. Presentation data can include, for example, virtual data to be presented in association with the recognized offline target. The presentation effect can include a presentation effect for presenting the presentation data in the reality scene.

For example, if an offline target is a logo picture of an offline shop, then the presentation data can be label data to be presented in association with the logo of the offline shop, for example, including basic information and discount information of the shop. The presentation effect can include a self-defined special presentation effect used when the label data is presented in association with the logo of the shop, for example, a self-defined animation effect, dynamic presentation template, and presentation text.

The AR server can include a server, a server cluster, or a cloud service platform established on the basis of the server cluster. The AR server can provide services for the AR device. For example, when the AR device is a third-party payment application integrated with an AR service function, the AR server can be a cloud service platform that provides a connection service for the third-party payment. The AR server can recognize, on the basis of a back-end AR engine, an image scanned by the AR device, eliminating, for example, the need for an image recognition process on the AR device. The AR server can manage content of virtual data related to an offline service. The AR server can push virtual data related to a recognized offline target to the AR device, where the virtual data is identified on the basis of an image recognition result. The preset picture feature sample library can include picture feature samples extracted from a large number of sample pictures of offline targets.

The user information can include user data used as a screening dimension for screening the picture feature sample library. In some implementations, the user data can include a location of the user. In some implementations, the AR device can upload the location of the user to the AR server in real time. The AR server can screen out, from the picture feature sample library on the basis of the location of the user uploaded by the AR device, picture feature samples for which distances to the user are within a certain range.

In some implementations, the user information can further include behavior logs of the user. In some implementations, the AR server can gather the behavior logs of the user uploaded by the AR device. The AR server can then perform data analysis on the gathered behavior logs of the user to determine a behavioral preference of the user. Then, the AR server can further screen out picture feature samples satisfying the behavioral preference of the user from the picture feature sample library screened out on the basis of the location of the user.

In some implementations, the user information can include a location of the user and behavior logs of the user. The AR server can preliminarily screen out, from the picture recognition material library on the basis of the location of the user, some picture feature samples from which distances to the location of the user are within a certain range. The AR server can further perform data analysis on the gathered behavior logs of the user to determine a behavioral preference of the user. The AR server can then further screen out, on the basis of the determined behavioral preference of the user, picture feature samples satisfying the behavioral preference of the user from these preliminarily screened-out picture feature samples. Then, the AR server can create the picture feature sample sub-library by using the further screened-out picture feature samples.

In some implementations, the user information can further include other user data that can be used as screening dimensions for screening the picture feature sample library. For example, in some implementations, in an initial state, the AR server can actively collect, by using a data collection system, picture samples and locations associated with the picture samples, to create a picture recognition material library.

By logging into a back-end management system included in the AR server, an operator can configure, for picture feature samples in the picture recognition material library, presentation data that needs to be presented in association with offline targets corresponding to the picture feature samples, and configure presentation effects for the presentation data. Moreover, the operator can further dynamically modify and update the configured presentation data and presentation effects by logging into the back-end management system included in the AR server.

When the user uses the AR device, the AR device can collect a location and behavior logs of the user, and then upload the information to the AR server in real time. The AR server can gather the location and the behavior logs, and manage the picture recognition materials in the picture recognition material library more flexibly on the basis of the user information and the behavior logs. In some implementations, the AR server can preliminarily screen out, for the AR device on the basis of the location uploaded by the device, picture feature samples from which distances to the location of the user are less than a preset threshold from the picture recognition material library.

In some implementations, the AR server can perform data analysis on the gathered behavior logs by using a cloud computing system to determine a behavioral preference of the user. The AR server can further screen out, on the basis of the determined behavioral preference, picture feature samples satisfying the behavioral preference of the user from the preliminarily screened-out picture feature samples. Using this information, the AR server can create a picture feature sample sub-library for the user, and the AR server can push the picture feature sample sub-library to the AR device. This process can significantly reduce the number of picture recognition materials pushed by the AR server, decrease the computation amount of the AR device during image recognition, and improve the image recognition efficiency of the AR device.

Figure 2:
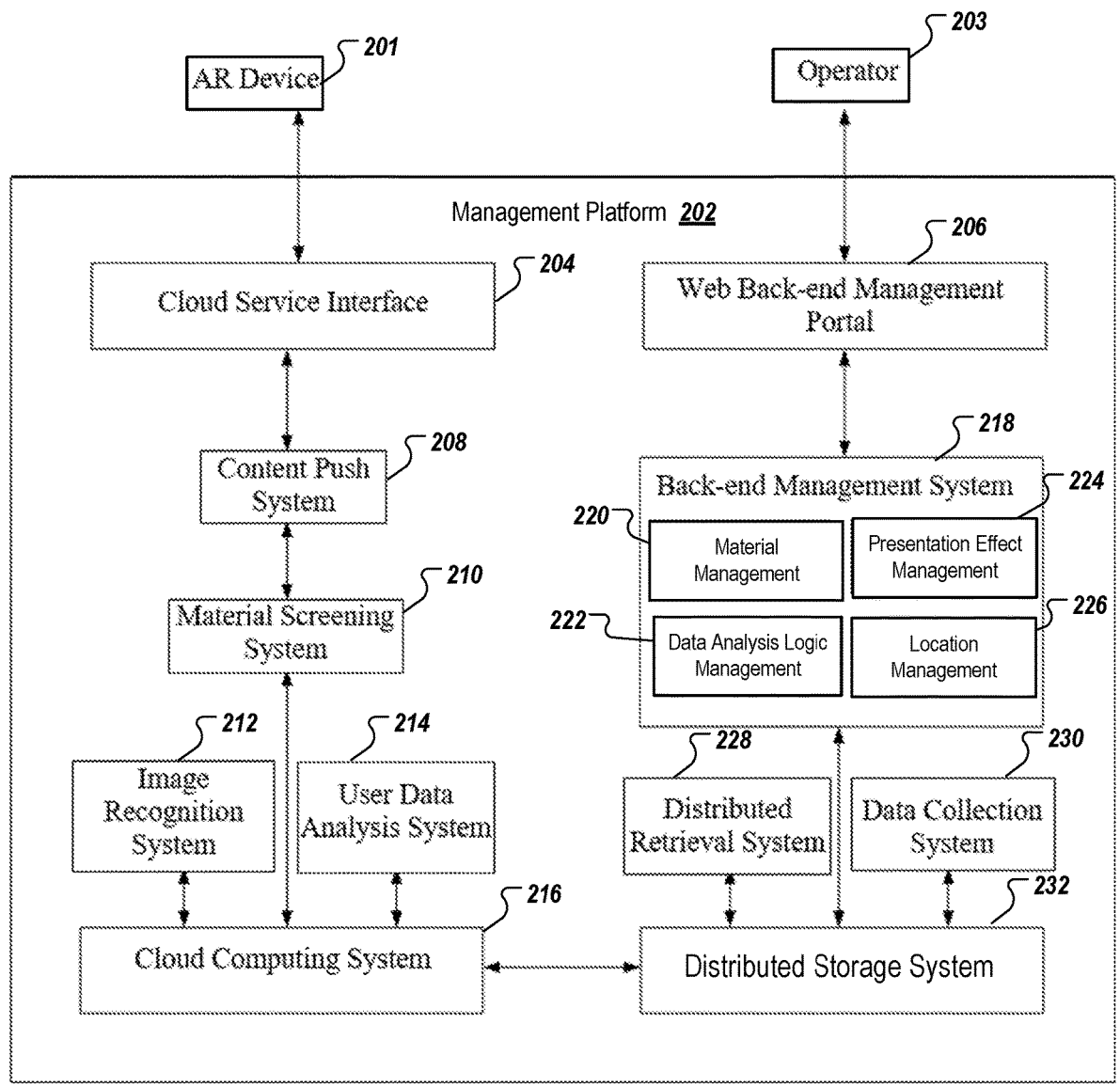
FIG. 2 is a block diagram illustrating an example of an Augmented Reality (AR) server, according to an implementation of the present disclosure.

FIG. 2 is a block diagram illustrating an example of an AR server 200, according to an implementation of the present disclosure. The AR server 200 can include a distributed architecture-based management platform for AR picture recognition (referred to as a management platform 202). Components of the management platform 202 can include a cloud service interface 204, a web back-end management portal 206, a distributed storage system 232, a back-end management system 218, a data collection system 230, a distributed retrieval system 228, a cloud computing system 216, an image recognition system 212, a user data analysis system 214, a material screening system 210, and a content push system 208. In some implementations, the back-end management system 218 can perform material management 220, data analysis logic management 222, presentation effect management 224, and location management 226.

The cloud service interface 204 can be a service interface used by the management platform 202 to provide services for an AR device 201. The AR device 201 can request a corresponding cloud service from the management platform 202 by accessing the cloud service interface 204. The management platform 202 can further return service data requested by the AR device 201 to the AR device 201 through the cloud service interface 204.

In some implementations, the cloud service interface 204 can be a hypertext transfer protocol (HTTP) interface. The AR device 201 can formulate a corresponding HTTP service request and submit the HTTP service request to the management platform 202 by accessing the HTTP interface. The management platform 202 can further return corresponding service data to the AR device 201 on the basis of the HTTP interface.

The web back-end management portal 206 can be a management portal used by an operator 203 to manually intervene in, or update, a picture recognition material library as well as related presentation data and presentation effects that are pre-configured in the management platform 202. The operator 203 can remotely log into the back-end management system 218, for example, by accessing a portal universal resource locator (URL) address of the management platform 202. During login, the operator 203 can input a management account and password. In this way, the operator 203 can use a consistent way to manage content in the management platform 202.

The storage system 232 can provide a database for the management platform 202. The storage system 232 can be used to store, in a distributed manner, the picture recognition material library as well as presentation data and presentation effects that are pre-configured by the operator 203 for picture feature samples in the picture recognition material library. In some implementations, distributed storage can allow the storage system 232 to serve as a basis for the reliability of the whole management platform 202.

The back-end management system 218 can be a user platform used by the operator 203 to directly manage the management platform 202. The back-end management system 218 can provide the operator 203 with visible user interfaces corresponding to various management operations. The operator 203 can perform corresponding management operations in these visible user interfaces. Operations can include, for example, adding a picture feature sample serving as a picture recognition material to the picture recognition material library, deleting a picture feature sample serving as a picture recognition material from the picture recognition material library, updating a picture feature sample serving as a picture recognition material in the picture recognition material library, pre-configuring, for the AR device 201, presentation data to be presented in association with a recognized offline target and a presentation effect, and dynamically updating the configured presentation data and presentation effect according to an actual requirement.

In some implementations, in addition to managing content in the management platform 202 by logging into the back-end management system 218, the operator 203 can further intervene in other systems in the management platform 202 by using the back-end management system 218. For example, the operator 203 can manually edit and intervene in data analysis logic and parameters of the cloud computing system 216. The operator 203 can further edit and adjust a user location stored in association with the picture feature samples in the picture recognition material library. The data collection system 230 can be used to actively collect data from the Internet or a connected third-party server that are required by the management platform 202.

In conventional management platforms, picture recognition materials are typically input and edited manually by the operator. However, in the present disclosure, the management platform 202 can actively collect picture recognition materials from the Internet or the connected third-party server by including a data collection system 230, and store the collected materials in the distributed storage system 232. Moreover, in addition to actively collecting picture recognition materials, the data collection system 230 can further actively gather behavior logs of the user uploaded by the AR device 201 to facilitate subsequent data analysis performed by the cloud computing system 216.

The retrieval system 228 can be mainly used to retrieve and query data stored in the storage system 232. The management platform 202 can manage a large number of picture recognition materials and data such as locations associated with the picture recognition materials, presentation data, and presentation effects. For ease of data retrieval and query, the management platform 202 can include a retrieval system 228 connected to the storage system 232. Data needing to be managed in the management platform 202 can be retrieved and queried by using the retrieval system 228. In some implementations, the retrieval system 228 can be a distributed system including multiple computing devices, thus ensuring flexibility and stability of data management.

The cloud computing system 216 can be used to undertake calculations to be performed by the management platform 202. In some implementations, the cloud computing system 216 can be separately connected to the distributed storage system 232, the user data analysis system 214, the material screening system 210, and the image recognition system 212. The cloud computing system 216 can undertake all data calculations of the distributed storage system 232, the user data analysis system 214, the material screening system 210, and the image recognition system 212. This type of central computing can improve the data processing efficiency of the management platform 202. In some implementations, the data analysis logic included in the cloud computing system 216 can be manually set by the operator 203 by using the back-end management system 218.

The image recognition system 212 can be used to provide a cloud image recognition service for the AR device 201. The image recognition system 212 can be connected to the cloud computing system 216. The image recognition system 212 can extract, by using the cloud computing system 216, a picture feature from image data uploaded by the AR device 201. The image recognition system 212 can then calculate degrees of similarity between the extracted picture feature and the picture feature samples in the picture recognition material library one-by-one to complete image recognition for the image data.

The user data analysis system 214 can be used to perform data analysis on the behavior logs of the user gathered by the data collection system 230. The image recognition system 212 can be connected to the cloud computing system 216. The image recognition system 212 can perform, by using a data analysis algorithm provided by the cloud computing system 216, the data analysis on the behavior logs of the user to obtain a behavioral preference of the user. In some implementations, the data analysis algorithm provided by the cloud computing system 216 can also be manually set by the operator 203 by using the back-end management system 218.

The material screening system 210 can be used to screen out, from the picture recognition material library stored in the distributed storage system 232, picture feature samples associated with user information uploaded by the AR device 201. The material screening system 210 can be connected to the cloud computing system 216. The material screening system 210 can separately calculate, by using the cloud computing system 216, distances between locations associated with the picture feature samples in the picture recognition material library and the location of the user. The material screening system 210 can screens out, from the foregoing picture feature sample library, picture feature samples from which the distances to the location of the user are less than a preset threshold.

After the data analysis is performed on the gathered behavior logs of the user by using the cloud computing system 216, the material screening system 210 can determine a behavioral preference of the user and further screen out picture feature samples satisfying the behavioral preference of the user from these preliminarily screened-out picture feature samples. The material screening system 210 can then create the picture feature sample sub-library on the basis of the further screened-out picture feature samples. The content push system 208 can be used to push, to the AR device 201, the picture feature sample sub-library created by the material screening system 210 on the basis of the screened-out picture feature samples.

When the AR device 201 successfully recognizes an offline target corresponding to any picture feature sample in the picture feature sample sub-library, the content push system 208 can push, to the AR device 201, presentation data and a presentation effect that are stored in association with the picture feature sample in the distributed storage system 232. The AR device 201 can display, on the basis of the presentation effect, the presentation data in an augmented manner on a location corresponding to the recognized offline target in an AR scene.

In some implementations, a technical solution of the present disclosure can include three stages: creation of a picture feature sample library, screening of picture feature samples, and image recognition. In some implementations, multiple components shown in FIG. 2 can be combined, such as for improved efficiency, into single components. In some implementations, components can be subdivided based on functionality.

In some implementations, a first phase of the technical solution of the present disclosure can include the creation of a picture feature sample library. In some implementations, an operator 203 can manually add corresponding picture feature samples and associated locations to a picture recognition material library by logging into the back-end management system 218. In addition, a management platform 202 can further actively collect picture samples and locations associated with the picture samples by using a data collection system 230. In some implementations, the data collection system 230 can actively collect picture samples and locations associated with the picture samples from numerous online service data on the Internet in a manner such as an Internet crawler.

In some implementations, in addition to actively collecting the picture samples from the numerous online service data, the data collection system 230 can further directly collect picture samples and locations associated with the picture samples from a connected third-party server that stores the picture samples and the locations. For example, the management platform 202 can import picture samples and locations associated with the picture samples that are stored in a connected partner service platform.

In some implementations, the collected picture samples and associated locations can be all stored in the distributed storage system 232. The cloud computing system 216 can extract, by using a picture feature extraction algorithm, picture features from the picture samples stored in the distributed storage system 232. The cloud computing system 216 can then create the picture recognition material library in the distributed storage system 232 on the basis of the extracted picture features and the locations associated with the picture samples. Information stored in the created picture recognition material library can include the extracted picture features corresponding to the picture samples and the locations associated with the picture samples.

After the picture recognition material library is created, the operator 203 can access a portal URL address of the management platform 202 by using a web browser. The operator 203 can then input a management account and password to remotely log into the back-end management system 218 to manage content in the management platform 202.

Upon successfully logging into the back-end management system 218, the operator 203 can perform a corresponding management operation in a visible user interface provided by the back-end management platform 202. The user interface can be used to configure, for each picture feature sample in the picture recognition material library, presentation data that needs to be presented in association with an offline target corresponding to the picture feature sample. The user interface can also be used to configure a presentation effect for the presentation data. The back-end management system 218 can acquire the presentation data and the presentation effect that are configured by the operator, and store the acquired presentation data and presentation effect in association with corresponding picture feature sample in the picture recognition material library, to facilitate retrieval.

In some implementations, the operator 203 can further perform a corresponding update operation on the configured presentation data and presentation effect in a visible user interface provided by the back-end management system 218 to dynamically update the configured presentation data and presentation effect. In response to the update operation of the operator 203, the back-end management system 218 can query the picture recognition material library for a corresponding picture feature sample by using the distributed retrieval system 218. The back-end management system 218 can then update, on the basis of presentation data and a presentation effect that are re-configured by the operator, the original presentation data and presentation effect that are stored in association with the picture feature sample. In this manner, the operator 203 can dynamically update, by logging into the back-end management system 218, presentation data and presentation effects stored in association with the picture feature samples in the picture recognition material library at any time according to an actual requirement, thus improving management flexibility of the presentation data and the presentation effects.

In some implementations, a second phase of the technical solution of the present disclosure can include screening of picture feature samples. In some implementations, when a user uses an AR device, the AR device can collect a location and behavior logs of the user, and then upload the collected location and behavior logs of the user to the management platform 202 in real time by accessing the cloud service interface 204. The management platform 202 can gather, by using the data collection system 230, the location and the behavior logs of the user uploaded by the AR device 201. The management platform 202 can more flexibly manage picture recognition materials in the picture recognition material library on the basis of the user information and behavior logs uploaded by the AR device 201.

In some implementations, the material screening system 210 can be connected to the cloud computing system 216, and the cloud computing system 216 can undertake all data screening calculations. The cloud computing system 216 can calculate, in real time, distances between the location of the user uploaded by the AR device 201 and locations associated with the picture feature samples in the picture recognition material library. After the cloud computing system 216 completes the calculation, the material screening system 210 can preliminarily screen out picture feature samples for which the distances to the location of the user are less than a preset threshold. In this case, a preliminary screening on the picture recognition material library is completed.

In an example, an application scenario can exist in which the picture recognition material library stores picture feature samples extracted from a large number of offline shop logos and the user performs daily scanning in the offline shops by using the AR device 201. Before the user scans a logo of an offline shop by using the AR device 201, the AR device 201 can upload a location of the user to the management platform 202 in real time. The management platform 202 can screen out, from the picture recognition material library on the basis of the location of the user, logo pictures of merchants in a particular range near the user to generate a picture feature sample sub-library for the user, thus reducing the number of logo pictures that need to be pushed to the AR device 201.

In some implementations, the user data analysis system 214 can also be connected to the cloud computing system 216. The cloud computing system 216 can undertake all data analysis calculations. The cloud computing system 216 can perform, on the basis of a data analysis algorithm, data analysis on the behavior logs of the user gathered by the data collection system to determine a behavioral preference of the user. The behavioral preferences can refer to specific usage habits or usage rules formed during daily use of the AR device 201 by the user.

For example, the picture recognition material library can store picture feature samples extracted from a large number of offline shop logos, and the user can perform daily scanning in the offline shops by using the AR device 201. The AR device 201 can locally record related behavior data generated each time when the user scans the offline shop, generate corresponding log files, and upload all the log files to the management platform 202. The management platform 202 can perform data analysis on the gathered log files by using the cloud computing system 216 to further analyze a preference of the user for the offline shops. For example, preferences can indicate, based on daily actions of the user, that the user prefers an offline shop offering a coupon and an offline shop selling low-price commodities.

After the management platform 202 determines the behavioral preference of the user by means of data analysis on the behavior logs, in order to further reduce the number of the preliminarily screened-out picture feature samples and decrease the number of picture recognition materials to be pushed, the material screening system 210 can further screen out picture feature samples satisfying the behavior preference of the user from the preliminarily screened-out picture feature samples.

In another example, the picture recognition material library can store picture feature samples extracted from a large number of offline shop logos, and the user can perform daily scanning in the offline shops by using the AR device. Assuming that the management platform 202 learns, by analysis, that a daily behavioral preference of the user is "an offline shop offering a coupon" and "an offline shop selling low-price commodities", the material screening system 210 can further search, by accessing related information of offline shops corresponding to these preliminarily screened-out picture feature samples, for an offline shop that can offer a coupon to the user and an offline shop selling low-price commodities. Then, the material screening system 210 can further screen out picture feature samples corresponding to these offline shops.

Upon screening out the picture feature samples that satisfy the behavioral preference of the user from the preliminarily screened-out picture feature samples, the management platform 202 can create a picture feature sample sub-library for the user on the basis of these finally screened-out picture feature samples. Then, the management platform 202 can push the created picture feature sample sub-library to the AR device 201 by using the content push system 208.

In some implementations, when screening the picture features samples in the picture recognition material library, the material screening system 210 can perform preliminary screening based on the location of the user and can then perform further screening based on the user preference obtained through analysis. The material screening system 210 can also directly create the picture feature sample sub-library for the user on the basis of a preliminary screening result without performing further screening based on the user preference obtained through analysis.

In some implementations, a third phase of the technical solution of the present disclosure can include image recognition. For example, upon receiving the picture feature sample sub-library pushed by the management platform, the AR device 201 can load the picture feature sample sub-library locally. When the user uses the AR device 201 to scan images in an offline environment, the AR device 201 can extract a picture feature from the scanned image information on the basis of an image recognition algorithm included in a front-end AR engine. The AR device 201 can then perform similarity matching between the picture feature and the picture feature samples in the picture feature sample sub-library to complete image recognition on the scanned image information.

The picture feature samples in the picture feature sample sub-library pushed by the management platform 202 can be screened out in a refined manner on the basis of the location and the behavioral preference of the user. Therefore, when performing image recognition on image data scanned from an offline environment of the user, the AR device 201 does not need to successively traverse all picture recognition materials in the picture recognition material library created in the management platform 202. This process can significantly improving the image recognition efficiency of the AR device 201.

In addition to locally performing image recognition on the scanned image information, the AR device 201 can further upload the scanned image information to the management platform 202 in real time by accessing the cloud service interface 204. An image recognition system 212 included in the management platform 202 can completes image recognition on the scanned image information on the basis of the picture feature sample sub-library screened-out and created for the user.

In some implementations, when an offline target corresponding to any picture feature sample in the picture feature sample sub-library is finally recognized from the scanned image information through an image recognition process, the distributed retrieval system 228 can query the distributed storage system 232 for presentation data and a presentation effect that are stored in association with the picture feature sample, and then push the found presentation data and presentation effect to the AR device 201 by using the content push system 208. After receiving the presentation data, the AR device 201 can display, on the basis of the presentation effect, the presentation data in an augmented manner on a location corresponding to the recognized offline target in an AR scene.

In some implementations, the presentation data and the presentation effect that are stored in association with the picture feature samples in the picture feature sample sub-library can also be pushed by the content push system 208 to the AR device 201 while the content push system 208 pushes the created picture feature sample sub-library. That is, the presentation data and the presentation effect that are configured by the operator 203 can be pushed to the AR device 201 together with the created picture feature sample sub-library, or can be separately pushed after completion of image recognition.

An AR server can flexibly screen out picture recognition materials for an AR device 201 on the basis of user information uploaded by the AR device 201 and push the screened-out materials to the AR device 201. The AR server can gather the user information uploaded by the AR device 201, screen out picture feature samples associated with the user information from a preset picture feature sample library, and generate, on the basis of the screened-out picture feature samples, a picture feature sample sub-library corresponding to the user information. Then, the AR server can push the picture feature sample sub-library to the AR device 201. In this way, during image scanning in an offline environment of a user, the AR device 201 can perform image recognition on the scanned image information on the basis of the picture feature sample sub-library. Because the AR server screens the picture feature sample library on the basis of the user information, the number of picture recognition materials pushed by the AR server to the AR device 201 and the number of picture recognition materials used when the AR device 201 performs image recognition can be significantly reduced. This can lead to a reduction in the computation amount of the AR device 201 and can improve the image recognition efficiency of the AR device 201.

Figure 3:
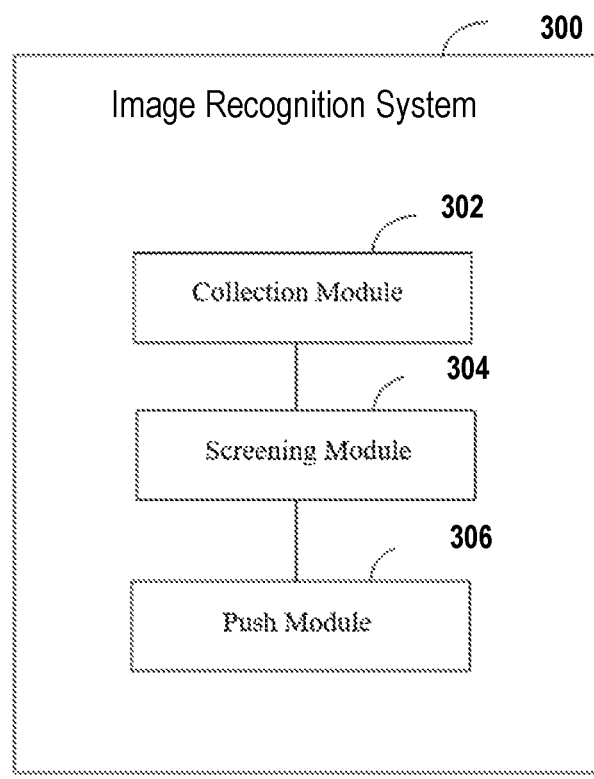
FIG. 3 is a block diagram illustrating an example of a system for performing image recognition based on augmented reality, according to an implementation of the present disclosure.

FIG. 3 is a block diagram illustrating an example of a system 300 for performing image recognition based on augmented reality, according to an implementation of the present disclosure. The system 300 can be implemented, for example, in one or more AR servers that serve plural AR clients 201. The system 300 can include some or all of the management platform 202.

In some implementations, the system 300 can include the following modules. A collection module 302 can be configured to gather user information uploaded by an AR device. A screening module 304 can be configured to screen out picture feature samples associated with the user information from a preset picture feature sample library. A pushing module 306 can be configured to generate, on the basis of the screened-out picture feature samples, a picture feature sample sub-library corresponding to the user information. The pushing module 306 can push the picture feature sample sub-library to the AR device 201.

In some implementations, the system 300 can also include a collection module 302 that is configured to collect picture samples and locations associated with the picture samples that are stored a connected third-party server. The collection module 302 can also be configured to collect picture samples from online service data, using a preset data collection algorithm, and locations associated with the picture samples.

In some implementations, the system 300 can also include a creation module that is configured to extract picture feature samples from the collected picture samples and locally create the picture feature sample library on the basis of the extracted picture feature samples and the locations associated with the picture samples. In some implementations, the system 300 can also include an acquisition module that is configured to acquire presentation data configured by an operator for the picture feature samples in the picture feature sample library and presentation effects configured for the presentation data.

In some implementations, the system 300 can also include a storage module that is configured to store the acquired presentation data and presentation effects in association with the picture feature samples in the picture feature sample library. The storage module can also dynamically update the presentation data and the presentation effects in response to an update operation of the operator.

In some implementations, the system 300 can also include a recognition module that is configured to receive the scanned image information uploaded by the AR device 201. The recognition module can also perform image recognition on the image information on the basis of the generated picture feature sample sub-library.

In some implementations, the pushing module 306 can be also be configured to push presentation data associated with the picture feature sample and a presentation effect associated with the presentation data to the AR device 201, such as when an offline target corresponding to any picture feature sample in the picture feature sample sub-library is recognized from the image information. Using the pushed information, the AR device 201 can display, on the basis of the presentation effect, the presentation data in an augmented manner on a location corresponding to the offline target in an augmented reality scene.

In some implementations, the screening module 304 can be configured to calculate distances between the location of the user uploaded by the AR device 201 and locations associated with the picture feature samples in the picture feature sample library and screen out, from the picture feature sample library, picture feature samples which have the distances less than a preset threshold. In some implementations, the user information can further include behavior logs of the user, and the screening module 304 can be further configured to perform data analysis on the gathered behavior logs of the user to determine a behavioral preference of the user and further screen out picture feature samples satisfying the behavioral preference of the user from the picture feature samples which have the distances less than the preset threshold.

Figure 4:
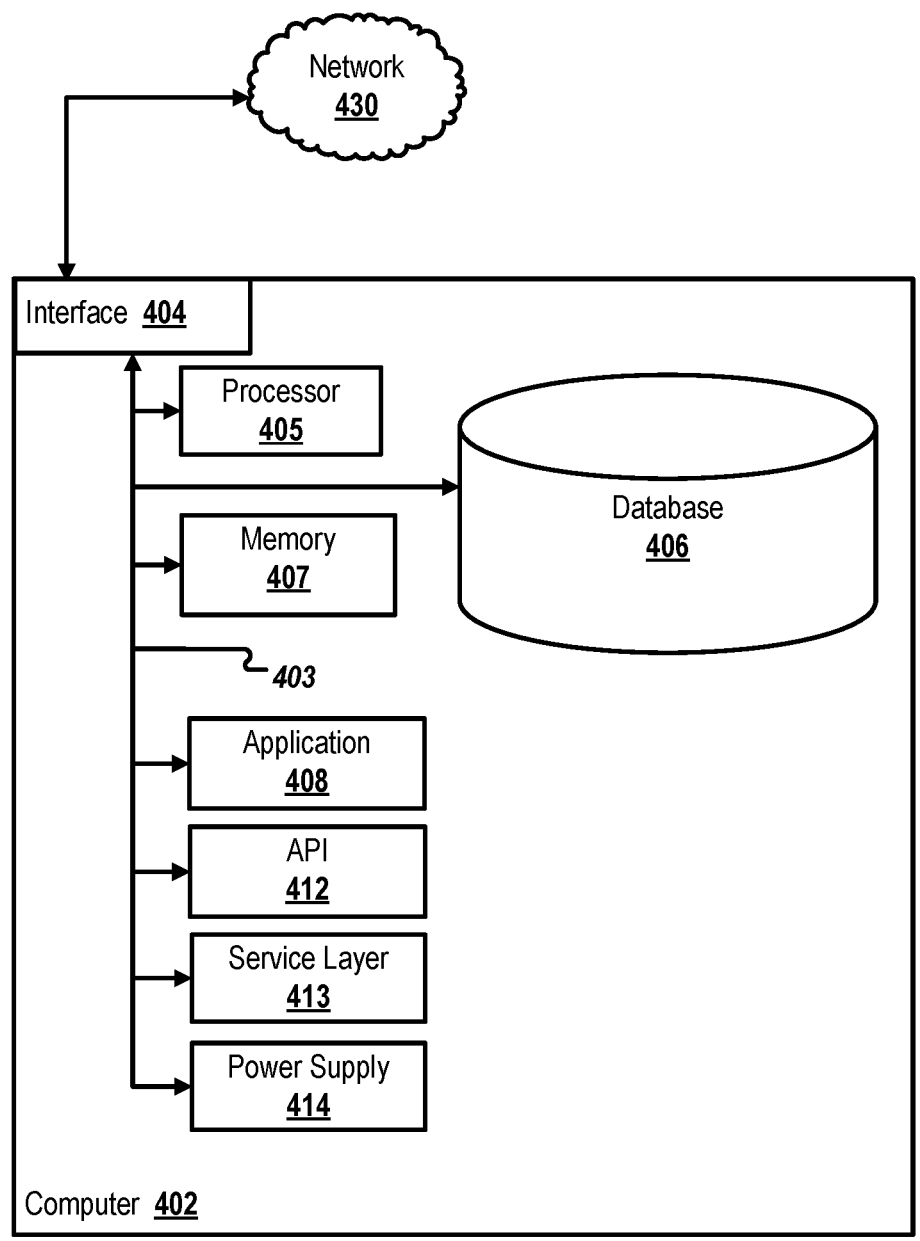
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a method includes: receiving, at a server and from an augmented reality device, user information of a user using the augmented reality device; generating, by the server, a picture feature sample sub-library corresponding to the user information, including screening out, from a preset picture feature sample library, picture feature samples associated with the user information; and providing, to the augmented reality device, the picture feature sample sub-library, wherein the picture feature sample sub-library can be configured to be used by the augmented reality device to perform, during image scanning of an offline environment of the user, image recognition of images scanned from the offline environment by comparing the scanned images to picture features in the picture feature sample sub-library.

The foregoing and other described implementations can each, optionally, include one or more of the following features:

A first feature, combinable with any of the following features, wherein the user information includes a location of the user, and wherein the method further comprises: collecting, from a connected third-party server, first picture samples and first locations associated with the first picture samples; collecting, from online service data and using a preset data collection algorithm, second picture samples and second locations associated with the second picture samples; extracting picture feature samples from the first and second picture samples; and updating the preset picture feature sample library using the extracted picture feature samples.

A second feature, combinable with any of the previous or following features, further comprising: acquiring, from an operator, presentation data and presentation effects configured for the picture feature samples in the preset picture feature sample library; storing the acquired presentation data and presentation effects in association with the picture feature samples in the preset picture feature sample library; and dynamically updating the presentation data and the presentation effects in response to an update operation of the operator.

A third feature, combinable with any of the previous or following features, further comprising: providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

A fourth feature, combinable with any of the previous or following features, further comprising: receiving, from the augmented reality device, the scanned image information; and performing, on the server, the image recognition on the image information on the basis of the generated picture feature sample sub-library.

A fifth feature, combinable with any of the previous or following features, wherein screening out picture feature samples associated with the user information from the preset picture feature sample library comprises: calculating distances between the location of the user and locations associated with the picture feature samples; and screening out, from the preset picture feature sample library, picture feature samples which have the distances less than a preset threshold.

A sixth feature, combinable with any of the previous or following features, wherein the user information further comprises behavior logs of the user, and wherein the method further comprises: performing data analysis on the behavior logs of the user to determine a behavioral preference of the user; and further screening out picture feature samples satisfying the behavioral preference of the user from the picture feature samples which have the distances less than the preset threshold.

In a second implementation, a non-transitory, computer-readable medium storing one or more instructions executable by a computer system to perform operations comprising: receiving, at a server and from an augmented reality device, user information of a user using the augmented reality device; generating, by the server, a picture feature sample sub-library corresponding to the user information, including screening out, from a preset picture feature sample library, picture feature samples associated with the user information; and providing, to the augmented reality device, the picture feature sample sub-library, wherein the picture feature sample sub-library can be configured to be used by the augmented reality device to perform, during image scanning of an offline environment of the user, image recognition of images scanned from the offline environment by comparing the scanned images to picture features in the picture feature sample sub-library.

The foregoing and other described implementations can each, optionally, include one or more of the following features:

A first feature, combinable with any of the following features, wherein the user information includes a location of the user, and wherein the method further comprises: collecting, from a connected third-party server, first picture samples and first locations associated with the first picture samples; collecting, from online service data and using a preset data collection algorithm, second picture samples and second locations associated with the second picture samples; extracting picture feature samples from the first and second picture samples; and updating the preset picture feature sample library using the extracted picture feature samples.

A second feature, combinable with any of the previous or following features, the operations further comprising: acquiring, from an operator, presentation data and presentation effects configured for the picture feature samples in the preset picture feature sample library; storing the acquired presentation data and presentation effects in association with the picture feature samples in the preset picture feature sample library; and dynamically updating the presentation data and the presentation effects in response to an update operation of the operator.

A third feature, combinable with any of the previous or following features, the operations further comprising: providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

A fourth feature, combinable with any of the previous or following features, the operations further comprising: receiving, from the augmented reality device, the scanned image information; and performing, on the server, the image recognition on the image information on the basis of the generated picture feature sample sub-library.

A fifth feature, combinable with any of the previous or following features, wherein screening out picture feature samples associated with the user information from the preset picture feature sample library comprises: calculating distances between the location of the user and locations associated with the picture feature samples; and screening out, from the preset picture feature sample library, picture feature samples which have the distances less than a preset threshold.

A sixth feature, combinable with any of the previous or following features, wherein the user information further comprises behavior logs of the user, and wherein the method further comprises: performing data analysis on the behavior logs of the user to determine a behavioral preference of the user; and further screening out picture feature samples satisfying the behavioral preference of the user from the picture feature samples which have the distances less than the preset threshold.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, at a server and from an augmented reality device, user information of a user using the augmented reality device; generating, by the server, a picture feature sample sub-library corresponding to the user information, including screening out, from a preset picture feature sample library, picture feature samples associated with the user information; and providing, to the augmented reality device, the picture feature sample sub-library, wherein the picture feature sample sub-library can be configured to be used by the augmented reality device to perform, during image scanning of an offline environment of the user, image recognition of images scanned from the offline environment by comparing the scanned images to picture features in the picture feature sample sub-library.

The foregoing and other described implementations can each, optionally, include one or more of the following features:

A first feature, combinable with any of the following features, wherein the user information includes a location of the user, and wherein the method further comprises: collecting, from a connected third-party server, first picture samples and first locations associated with the first picture samples; collecting, from online service data and using a preset data collection algorithm, second picture samples and second locations associated with the second picture samples; extracting picture feature samples from the first and second picture samples; and updating the preset picture feature sample library using the extracted picture feature samples.

A second feature, combinable with any of the previous or following features, the operations further comprising: acquiring, from an operator, presentation data and presentation effects configured for the picture feature samples in the preset picture feature sample library; storing the acquired presentation data and presentation effects in association with the picture feature samples in the preset picture feature sample library; and dynamically updating the presentation data and the presentation effects in response to an update operation of the operator.

A third feature, combinable with any of the previous or following features, the operations further comprising: providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

A fourth feature, combinable with any of the previous or following features, the operations further comprising: receiving, from the augmented reality device, the scanned image information; and performing, on the server, the image recognition on the image information on the basis of the generated picture feature sample sub-library.

A fifth feature, combinable with any of the previous or following features, wherein screening out picture feature samples associated with the user information from the preset picture feature sample library comprises: calculating distances between the location of the user and locations associated with the picture feature samples; and screening out, from the preset picture feature sample library, picture feature samples which have the distances less than a preset threshold.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method comprising:
submitting, by an augmented reality device and to a server, user information of a user using the augmented reality device;
receiving, at the augmented reality device and from the server, a picture feature sample sub-library corresponding to the user information, wherein the picture feature sample sub-library is generated by the server based on screening out picture feature samples associated with the user information from a preset picture feature sample library; and performing, by the augmented reality device and during image scanning of a real-world environment of the user, image recognition of images scanned from the real-world environment by comparing the scanned images to picture features in the picture feature sample sub-library.

2. The method of claim 1, wherein the user information includes a location of the user, and wherein the method further comprises:
collecting, from a connected third-party server, first picture samples and first locations associated with the first picture samples;
collecting, from online service data and using a preset data collection algorithm, second picture samples and second locations associated with the second picture samples;
extracting picture feature samples from the first and second picture samples; and
updating the preset picture feature sample library using the extracted picture feature samples.

3. The method of claim 2, further comprising:
acquiring, from an operator, presentation data and presentation effects configured for the picture feature samples in the preset picture feature sample library;
storing the acquired presentation data and presentation effects in association with the picture feature samples in the preset picture feature sample library; and
dynamically updating the presentation data and the presentation effects in response to an update operation of the operator.

4. The method of claim 3, further comprising:
providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

5. The method of claim 1, further comprising:
receiving, from the augmented reality device, the scanned image information; and
performing, on the server, the image recognition on the image information on the basis of the generated picture feature sample sub-library.

6. The method of claim 2, wherein screening out picture feature samples associated with the user information from the preset picture feature sample library comprises:
calculating distances between the location of the user and locations associated with the picture feature samples; and
screening out, from the preset picture feature sample library, picture feature samples which have the distances less than a preset threshold.

7. The method of claim 6, wherein the user information further comprises behavior logs of the user, and wherein the method further comprises:
performing data analysis on the behavior logs of the user to determine a behavioral preference of the user; and
further screening out picture feature samples satisfying the behavioral preference of the user from the picture feature samples which have the distances less than the preset threshold.

8. A non-transitory, computer-readable medium storing one or more instructions executable by a computer system to perform operations comprising:
submitting, by an augmented reality device and to a server, user information of a user using the augmented reality device;
receiving, at the augmented reality device and from the server, a picture feature sample sub-library corresponding to the user information, wherein the picture feature sample sub-library is generated by the server based on screening out picture feature samples associated with the user information from a preset picture feature sample library; and
performing, by the augmented reality device and during image scanning of a real-world environment of the user, image recognition of images scanned from the real-world environment by comparing the scanned images to picture features in the picture feature sample sub-library.

9. The non-transitory, computer-readable medium of claim 8, wherein the user information includes a location of the user, and wherein the method further comprises:
collecting, from a connected third-party server, first picture samples and first locations associated with the first picture samples;
collecting, from online service data and using a preset data collection algorithm, second picture samples and second locations associated with the second picture samples;
extracting picture feature samples from the first and second picture samples; and
updating the preset picture feature sample library using the extracted picture feature samples.

10. The non-transitory, computer-readable medium of claim 9, the operations further comprising:
acquiring, from an operator, presentation data and presentation effects configured for the picture feature samples in the preset picture feature sample library;
storing the acquired presentation data and presentation effects in association with the picture feature samples in the preset picture feature sample library; and
dynamically updating the presentation data and the presentation effects in response to an update operation of the operator.

11. The non-transitory, computer-readable medium of claim 10, the operations further comprising:
providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

12. The non-transitory, computer-readable medium of claim 8, the operations further comprising:
receiving, from the augmented reality device, the scanned image information; and
performing, on the server, the image recognition on the image information on the basis of the generated picture feature sample sub-library.

13. The non-transitory, computer-readable medium of claim 9, wherein screening out picture feature samples associated with the user information from the preset picture feature sample library comprises:

calculating distances between the location of the user and locations associated with the picture feature samples; and screening out, from the preset picture feature sample library, picture feature samples which have the distances less than a preset threshold.

14. The non-transitory, computer-readable medium of claim 13, wherein the user information further comprises behavior logs of the user, and wherein the method further comprises:

performing data analysis on the behavior logs of the user to determine a behavioral preference of the user; and further screening out picture feature samples satisfying the behavioral preference of the user from the picture feature samples which have the distances less than the preset threshold.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

submitting, by an augmented reality device and to a server, user information of a user using the augmented reality device;

receiving, at the augmented reality device and from the server, a picture feature sample sub-library corresponding to the user information, wherein the picture feature sample sub-library is generated by the server based on screening out picture feature samples associated with the user information from a preset picture feature sample library; and performing, by the augmented reality device and during image scanning of a real-world environment of the user, image recognition of images scanned from the real-world environment by comparing the scanned images to picture features in the picture feature sample sub-library.

16. The computer-implemented system of claim 15, wherein the user information includes a location of the user, and wherein the method further comprises:

collecting, from a connected third-party server, first picture samples and first locations associated with the first picture samples;

collecting, from online service data and using a preset data collection algorithm, second picture samples and second locations associated with the second picture samples;

extracting picture feature samples from the first and second picture samples; and updating the preset picture feature sample library using the extracted picture feature samples.

17. The computer-implemented system of claim 16, the operations further comprising:

acquiring, from an operator, presentation data and presentation effects configured for the picture feature samples in the preset picture feature sample library;

storing the acquired presentation data and presentation effects in association with the picture feature samples in the preset picture feature sample library; and dynamically updating the presentation data and the presentation effects in response to an update operation of the operator.

18. The computer-implemented system of claim 17, the operations further comprising:

providing, when an offline target corresponding to any picture feature sample in the picture feature sample sub-library can be recognized from the image information, presentation data associated with the picture feature sample and a presentation effect associated with the presentation data to the augmented reality device, so that the augmented reality device displays, on the basis of the presentation effect, the presentation data in an augmented manner on a location corresponding to the offline target in an augmented reality scene.

19. The computer-implemented system of claim 15, the operations further comprising:

receiving, from the augmented reality device, the scanned image information; and performing, on the server, the image recognition on the image information on the basis of the generated picture feature sample sub-library.

20. The computer-implemented system of claim 16, wherein screening out picture feature samples associated with the user information from the preset picture feature sample library comprises:

calculating distances between the location of the user and locations associated with the picture feature samples; and screening out, from the preset picture feature sample library, picture feature samples which have the distances less than a preset threshold.

* * * * *